United States Patent [19]

Jagannathan

[11] Patent Number: 4,975,036
[45] Date of Patent: Dec. 4, 1990

[54] APPARATUS FOR THE CATALYTIC TREATMENT OF HYDROCARBON OILS

[75] Inventor: Aravamuthan Jagannathan, The Hague, Netherlands

[73] Assignee: Shell Oil Company, Houston, Tex.

[21] Appl. No.: 163,044

[22] Filed: Mar. 2, 1988

[30] Foreign Application Priority Data

Mar. 5, 1987 [GB] United Kingdom ............... 8705188

[51] Int. Cl.⁵ ............................................. B01J 8/12
[52] U.S. Cl. ................................. 422/216; 208/152; 208/166; 261/113; 261/114.1
[58] Field of Search ............ 422/212, 216, 219, 220; 208/152, 166; 261/114.1, 113

[56] References Cited

U.S. PATENT DOCUMENTS

| 2,337,419 | 12/1943 | Sensel | 422/191 |
| 2,904,506 | 9/1959 | Penick | 422/219 X |
| 3,607,000 | 9/1971 | Beal et al. | 422/216 X |
| 3,966,420 | 6/1976 | Pegels et al. | 422/191 |
| 4,229,418 | 10/1980 | Wijffels et al. | 422/220 X |
| 4,230,533 | 10/1980 | Giroux | 261/114.1 X |
| 4,357,304 | 11/1982 | Pegels et al. | 422/194 X |
| 4,446,112 | 5/1984 | Den Hartog | 422/219 X |
| 4,568,523 | 2/1986 | Wijffels et al. | 422/216 X |

Primary Examiner—Robert J. Warden
Assistant Examiner—Amalia L. Santiago
Attorney, Agent, or Firm—Kimbley L. Muller

[57] ABSTRACT

Process and apparatus for the catalytic treatment of hydrocarbon oils comprising the use of by-pass means allowing the transport of oil inside the reactor from above the uppermost catalyst bed to outlet means without contacting catalytic material during transport.

4 Claims, 2 Drawing Sheets

APPARATUS FOR THE CATALYTIC TREATMENT OF HYDROCARBON OILS

FIELD OF INVENTION

The invention relates to a process and apparatus for the catalytic treatment of hydrocarbon oils.

BACKGROUND OF INVENTION

During catalytic processes wherein hydrocarbon feedstocks are treated with hydrogen, carbonaceous matter and metals such as vanadium and nickel are usually deposited on the catalysts, which causes a gradual decline of catalytic activities. When catalyst particles have become deactivated to an unacceptable degree they have to be replaced by fresh and/or regenerated catalyst particles.

Conventionally, catalyst particles which gradually have become deactivated are replaced in a procedure which requires terminating the conversion process by allowing the temperature and pressure to decrease substantially (e.g. by means of a quench liquid) before unloading deactivated catalyst particles and loading fresh and/or regenerated catalyst particles.

Catalyst unloading processes are disclosed for instance in U.S. Pat. No. 3,883,312 wherein a substantially vertically cylindrical reactor is described having separate inlet means for reactant and catalyst at the upper part of the reactor, and containing catalyst bed supporting and guiding means comprising one or more screen sections for withdrawal of reactor effluent from the catalyst, the reactor being further provided with separate outlet means for reactor effluent and catalyst in a lower part of the reactor. Fresh and/or regenerated catalyst particles can be introduced continuously or periodically to such reactors and spent catalyst particles can be withdrawn continuously or periodically from such reactors.

It should be noted, however, that during the first mentioned conventional unloading procedure substantial temperature and pressure variations occur which may cause undesirable stress problems with respect to the reactor vessel, valves and solid materials concerned. Moreover, during unloading undesired reactions may occur which adversely affect product quality since the feed may be in contact with spent catalyst particles over too great a period of time. Furthermore, a substantial amount of time will be required to carry out such unloading operations.

In view of above it would be of importance to investigate whether it would be possible to transport oil inside the reactor under substantially operating conditions without contacting catalytic material during said transport, in particular during unloading procedures.

DETAILED DESCRIPTION OF INVENTION

It has now been found that (spent) catalyst particles in a movable bed reactor can be suitably replaced whilst maintaining the feed to be processed under substantially operating conditions by using internal by-pass facilities.

Therefore, the present invention relates to a process for the catalytic treatment of hydrocarbon oils which process comprises passing an oil in downflow over one or more catalyst beds in a reactor, the bottom of which contains a catalyst withdrawal system incorporating one or more screens at a point above the exit of the withdrawal system effecting separation of effluent and catalyst, and wherein fresh and/or regenerated catalyst can be introduced above the uppermost catalyst bed, and wherein spent catalyst can be withdrawn at the bottom of the lowermost catalyst bed, and which process is carried out in such a way that oil can be transported inside the reactor from above the uppermost catalyst bed to outlet means without contacting catalytic material during transport.

Preferably, the oil is transported inside the reactor from above the uppermost catalyst bed to outlet means situated above the effluent withdrawal area without contacting catalytic material during transport. The by-pass means will be normally provided with a valve in order to control the flow rate of reactants to be by-passed. Moreover, the by-pass may be of any suitable size or form as will be clear to those skilled in the art.

It should be noted that it is known from U.S. Pat. No. 3,607,000 to by-pass that portion of a catalyst bed which is contaminated, which reduces the pressure drop across the catalyst bed and prevents undesired side reactions by means of a by-pass which extends internally in a catalyst bed. However, such a reactor comprising said internal by-pass system will encounter time consuming unloading procedures.

The process according to the present invention is advantageously carried out in conjunction with conversion processes in which catalyst particles are employed, which relatively quickly may become deactivated, such as in hydrodemetallization and hydrodesulphurization processes. In such processes heavy hydrocarbonaceous feeds (e.g. atmospheric and/or vacuum residues of crude oils or shale oil) are catalytically upgraded in the presence of hydrogen, leaving carbonaceous and/or metal-containing deposits on the catalyst particles. Such processes are suitably carried out in a hydroconversion unit normally comprising a series of movable catalyst bed reactors, each having one or more catalyst beds. The catalyst of these processes can now be replaced without a substantial reduction in the temperature and pressure of the feed to these processes.

DETAILED DESCRIPTION OF THE DRAWINGS

Figure 1:
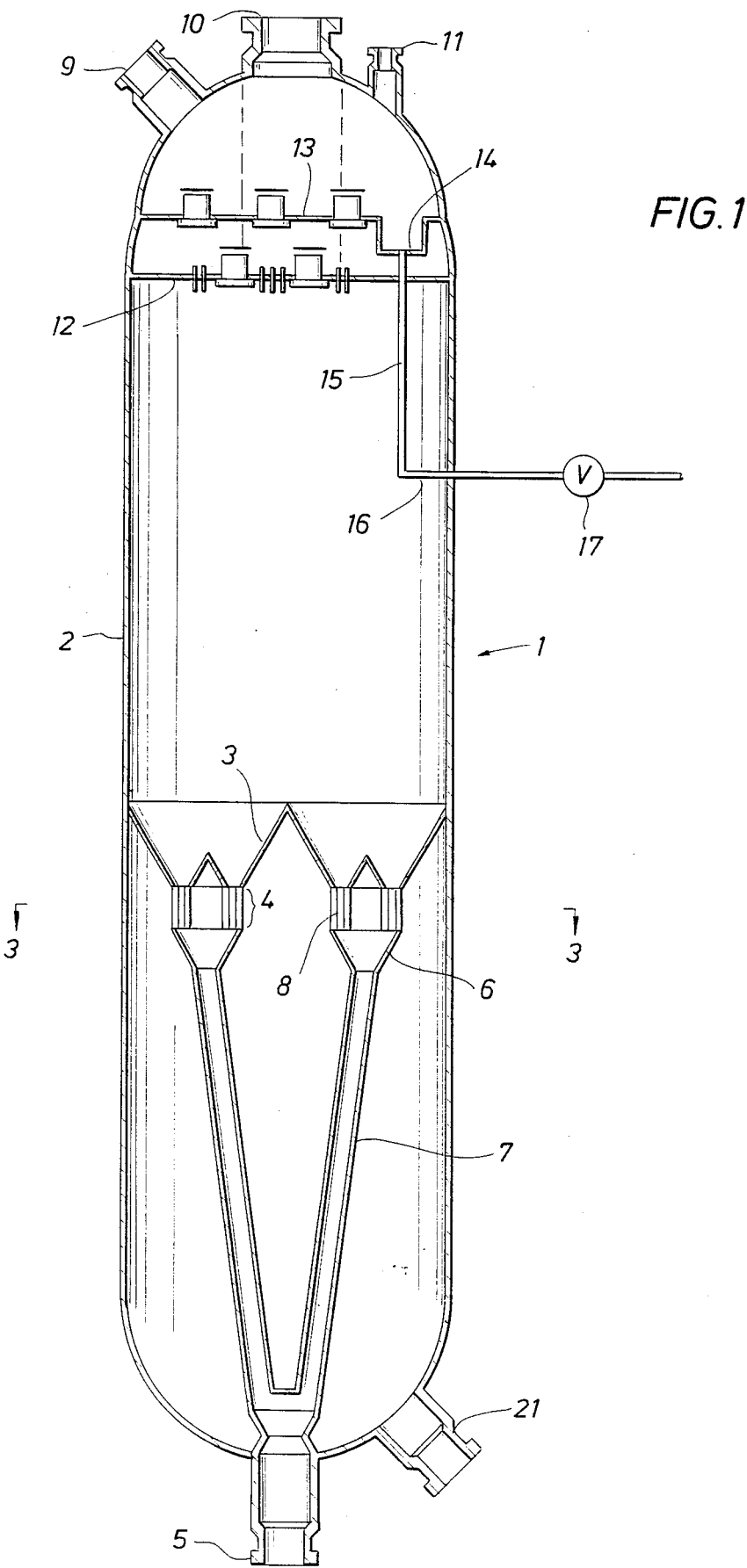
FIG. 1 schematically shows a longitudinal cross-section of a reactor vessel suitable for a process according to the invention.
Figure 2:
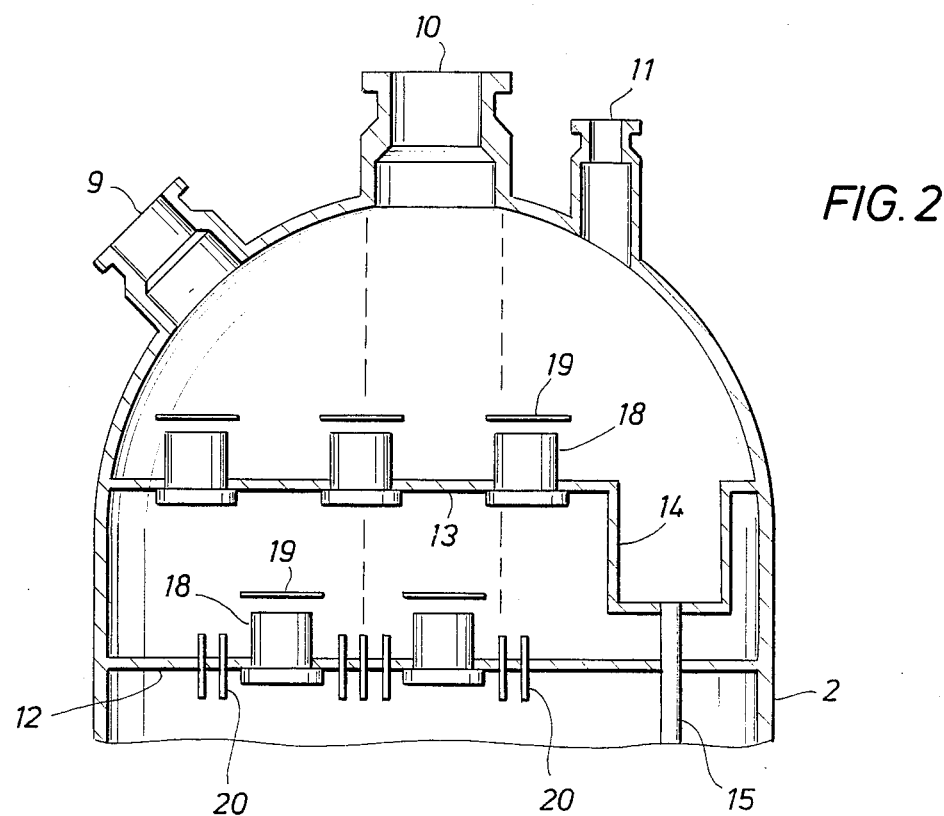
FIG. 2 schematically shows the upper part of the reactor vessel in more detail.
Figure 3:
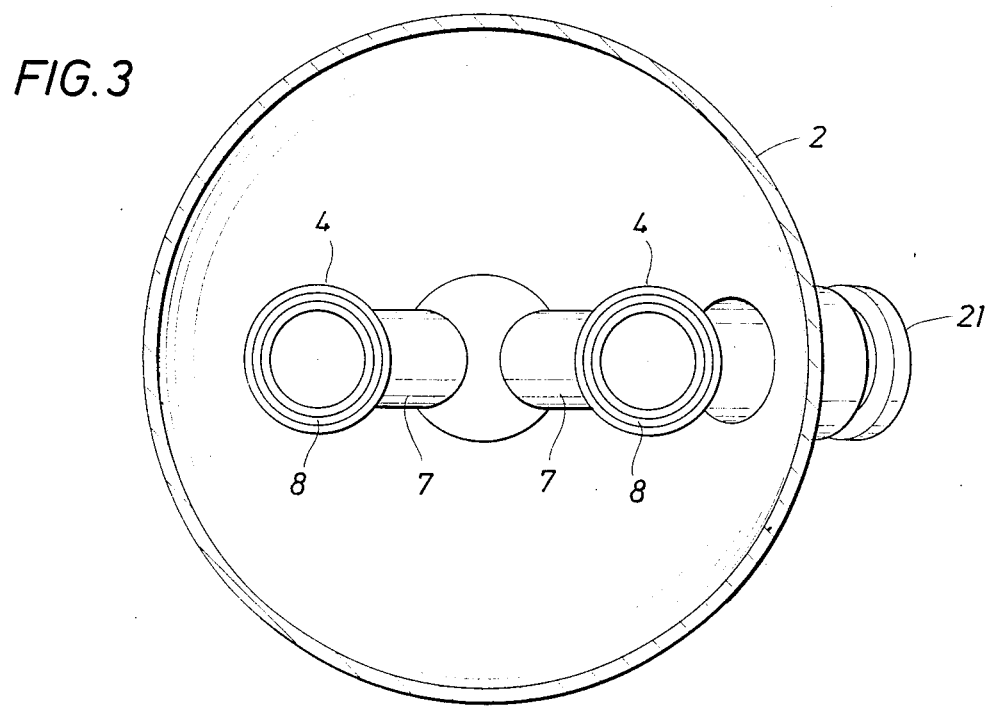
FIG. 3 shows the lower part of the reactor vessel taken along lines 3-3 of FIG. 1.

In FIGS. 1 and 2 the same reference numerals have been used for similar purposes, and accessories such as valves, pumps and control instruments not necessary for the purpose of understanding the present invention are not (all) shown.

In FIG. 1 a normally vertically extending reactor vessel 1 suitable for a process according to the invention is depicted, comprising a substantially cylindrical side wall 2. The lower part of the reactor vessel 1 is internally provided with supporting means for supporting catalyst particles, said supporting means consisting of a downwardly converging conical surface 3 terminating at the lower end thereof in a substantially vertical outlet channel 4 for the passage of catalyst particles and reactor effluent. To direct catalyst particles from outlet channel 4 towards catalyst outlet means 5, a lower conical segment 6 is provided which connects the lower end of outlet channel 4 and the catalyst outlet means 5 via tube 7. The angle with the vertical axis of the lower conical segment 6 should be such that the catalyst can smoothly pass through this segment 6 towards the catalyst outlet means 5.

The conical surface 3, the outlet channel 4 and the lower conical segment 6 are supported at the inner surface of the reactor vessel wall 2. Part or all of the outlet channel 4 is provided with a cylindrical screen section 8, for separating the reactor effluent, which passes through the screen section from the catalyst particles, said screen section 8 forming part of the wall of the outlet channel 4.

The upper part of the reactor vessel 1 is provided with inlet means 9 for fluid, inlet means 10 for the supply of fresh and/or regenerated catalyst particles, and inlet means 11 for a separate supply of hydrogen, if desired. For distributing fluid uniformly over the interior of the vessel a distributor tray 12 is arranged above the conical surface 3.

The upper part of the reactor vessel 1 which is depicted in more detail in FIG. 2 is further provided with a collector tray 13 upstream of the distributor tray 12. Collector tray 13 comprises a sump 14 from the bottom of which by-pass means 15 extends inside the reactor to outlet means 16 provided with a valve 17.

Both distributor tray 12 and collector tray 13 contain a plurality of chimneys 18 (see FIG. 2) having a cover or baffle plate 19 disposed above and separated from its associated chimney 18 in such a way that liquid feed can be prevented from dropping into the chimney but that the passage of gaseous feed therethrough can be permitted. Moreover, the distributor tray 12 is provided with a plurality of small substantially erected pipes 20 which allow liquid feed to pass through the distributor tray 12. Reactor effluent can be discharged from the reactor vessel 1 via an outlet means 21 downstream of the screen section 8, whilst catalyst particles can be withdrawn via catalyst outlet means 5.

It will be appreciated that the embodiment as depicted in FIG. 1 is not limited to two outlet channels 4 as described but the number of outlet channels 4 may range from two to for example 12, depending on the size of the individual outlet channels 4 chosen. For detailed description of bottom internals reference is made to U.S. Pat. No. 4,568,523.

During operation of the reactor, fresh and/or regenerated catalyst and reactant can be supplied into the upper part of the reactor vessel 1. Incoming reactants travel between the top of each chimney 18 of the collector tray 13 and its associated cover plate 19, and are distributed uniformly over the interior of the reactor vessel by means of distributor tray 12 through which gaseous material passes the chimneys 18, whilst liquid material passes through small substantially erected pipes 20. The liquid and gas subsequently travel downwards through the bed.

Having passed the conical surface 3 (see FIG. 1) catalyst particles and reactor effluent enter the outlet channel(s) 4 where reactor effluent is separated from catalyst particles via screen section(s) 8. The catalyst moves downwardly through the outlet channel 4 via the lower conical segment 6 and tubes 7 to catalyst outlet means 5, whilst reactor effluent can be discharged from the reactor vessel via outlet means 21.

In practice the by-pass system will be operated as follows.

Fresh and/or regenerated catalysts and reactants can be supplied into the upper part of the interior of the reactor vessel 1.

The gaseous material will pass the collector tray 13 and the distributor tray 12 through the chimneys 18, whilst the liquid material may be discharged from sump 14 by means of by-pass means 15 and its externally situated valve 17 opened in such a way that only the gaseous material will travel between the top of each chimney 18 and its associated cover plate 19.

In this manner spent catalyst can be unloaded with only gas flowing through the reactor, whilst the liquid is then transported from above the uppermost catalyst bed in the reactor to outlet means 16 without contacting catalytic material during transport. After unloading of catalyst, liquid feed can be routed into the reactor vessel when valve 17 has been closed and fresh and/or regenerated catalyst can be loaded.

The invention also relates to an apparatus suitable for carrying out the process as described hereinbefore, which comprises a substantially vertical reactor containing one or more catalyst bed supporting means, the bottom of which contains a catalyst withdrawal system incorporating one or more screens at a point above the exit of the catalyst withdrawal system, means to introduce fresh and/or regenerated catalyst above the uppermost catalyst bed supporting means and means to withdraw spent catalyst at the bottom of the lowermost catalyst bed supporting means, means to withdraw effluent from the reactor via one or more screens effecting separation of effluent and catalyst, and by-pass means to transport oil inside the reactor from above the uppermost catalyst bed supporting means to outlet means without contacting catalytic material during transport.

The apparatus is provided with a collector and a distributor tray which are located above the uppermost catalyst bed supporting means and allow an even distribution of reactants along the entire cross-section of the catalyst beds. The collector tray is provided to a sump (14) from which the by-pass means leads to or into the effluent withdrawal area or to the effluent outlet means. Preferably, the outlet means are situated above the effluent withdrawal system. The by-pass means will be normally provided with a valve to control the flow rate of reactants to be by-passed.

What we claim as our invention is:

1. An apparatus for the catalytic treatment of hydrocarbon oils comprising a liquid by-pass system for use during catalyst loading or unloading operations, which apparatus comprises:
    (a) a substantially vertical reactor being defined by an elongated exterior wall communicating with one or more catalyst bed support means having a bottom;
    (b) a first withdrawal means comprising one or more screens communicating with said bottom of said catalyst bed support means;
    (c) first inlet means to introduce fresh and/or regenerated catalyst to said reactor at a location in said reactor above said catalyst bed support means;
    (d) second inlet means to introduce liquid hydrocarbon oils and hydrogen to said reactor at a location in said reactor above said catalyst bed support means;
    (e) second catalyst withdrawal means to withdraw catalyst from said reactor at a location in said reactor below said catalyst bed support means;

(f) first liquid outlet means to withdraw treated liquid hydrocarbon oils from said reactor at a point below said catalyst bed support means, wherein said second catalyst withdrawal means of element (e) and said first liquid withdrawal means are separate and apart from one another;

(g) second liquid outlet means extending through said elongated exterior wall of said reactor to withdraw liquid hydrocarbon oils from said reactor to avoid contact of said hydrocarbon oils with said catalyst; and (h) by-pass system to pass said liquid hydrocarbon oils and hydrogen from said liquid hydrocarbon oils and hydrogen second inlet means of element (d) to said second liquid outlet means of element (g) comprising a distributor tray having vapor passage means, wherein said tray prevents passage of said liquid hydrocarbon oils through said tray and passes liquid hydrocarbon oils directly to said second outlet means by means of a sump prior to contact of said liquid hydrocarbon oils with said catalyst.

2. The apparatus of claim 1 wherein said vapor passage means comprise raised chimneys situated on said distributor tray and wherein said chimneys are equipped with side walls of sufficient height and a surmounted baffle to prevent entry of said hydrocarbon oils into said chimneys.

3. The apparatus of claim 1, wherein said distributor tray is located above said catalyst bed support means.

4. The apparatus of claim 1 wherein said second liquid outlet means communicates with a valve to control the flow rate of liquid hydrocarbon oils through said exterior wall of said vessel.

* * * * *